United States Patent [19]
Fredriksson

[11] Patent Number: 5,732,545
[45] Date of Patent: Mar. 31, 1998

[54] COUPLING LINK

[76] Inventor: Lars Olot Arne Fredriksson, Västerskärsringen 34., S-184 92 Åkersberga., Sweden

[21] Appl. No.: 771,171

[22] Filed: Dec. 20, 1996

[30] Foreign Application Priority Data

Dec. 22, 1995 [SE] Sweden .................. 9504631-4

[51] Int. Cl.⁶ .................... F16G 15/00
[52] U.S. Cl. .................... 59/93; 59/85; 59/86
[58] Field of Search .................... 59/93, 85, 86

[56] References Cited

U.S. PATENT DOCUMENTS

| | | | |
|---|---|---|---|
| 2,165,377 | 7/1939 | Henry | 59/93 |
| 3,545,200 | 12/1970 | Fagan | 59/93 |
| 3,601,978 | 8/1971 | Rieger | 59/93 |
| 3,729,926 | 5/1973 | Buske | 59/93 |
| 3,817,028 | 6/1974 | Blackwood | 59/93 |
| 3,962,811 | 6/1976 | Buschini et al. | 59/86 |
| 4,149,369 | 4/1979 | Smetz | 59/93 |

FOREIGN PATENT DOCUMENTS

| | | |
|---|---|---|
| 2947871 | 9/1981 | Germany . |
| 2353947 | 5/1996 | Germany .................. 59/86 |
| 130722 | 10/1974 | Norway . |
| 2127129 | 4/1984 | United Kingdom . |

*Primary Examiner*—David Jones
*Attorney, Agent, or Firm*—Quarles & Brady

[57] ABSTRACT

A coupling link for coupling two chain end portions to each other. The link body (1) is elongated with a length corresponding to at least twice the greatest width thereof, the link body being widest at a central portion. Each opposite end portion (2, 3) of the link body is formed as a fork-like portion with a transversal anchoring pin (7) for securely anchoring an end link of the associated chain end portion, whereas the central portion (4) of the link body is provided with a central opening (12) permitting insertion of a desired chain link (102) so as to enable the formation of a non-loaded shortening loop of at least one of the two chain end portions.

11 Claims, 3 Drawing Sheets

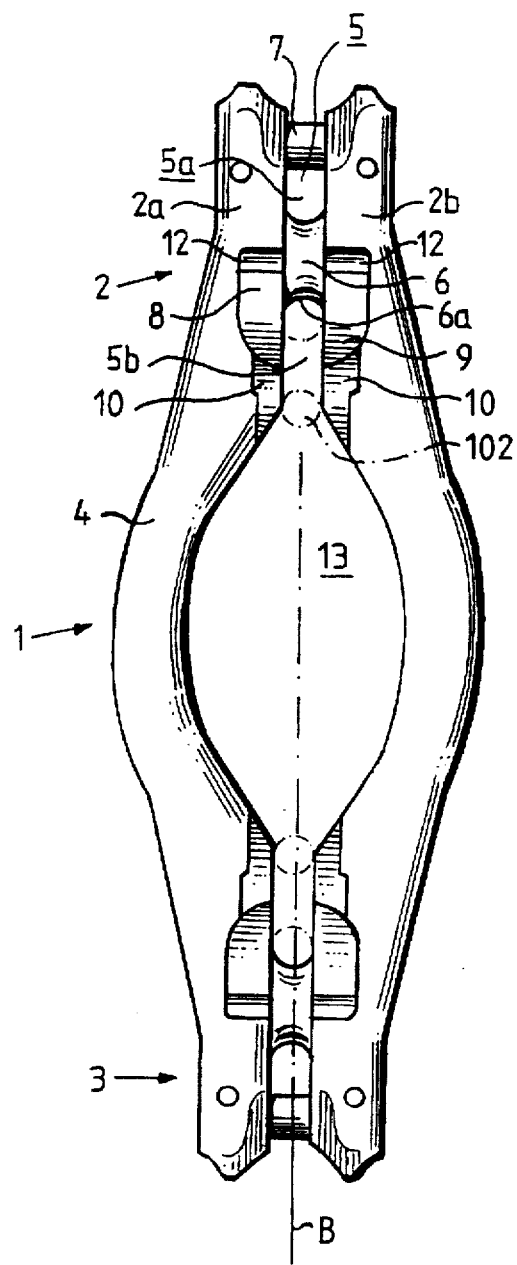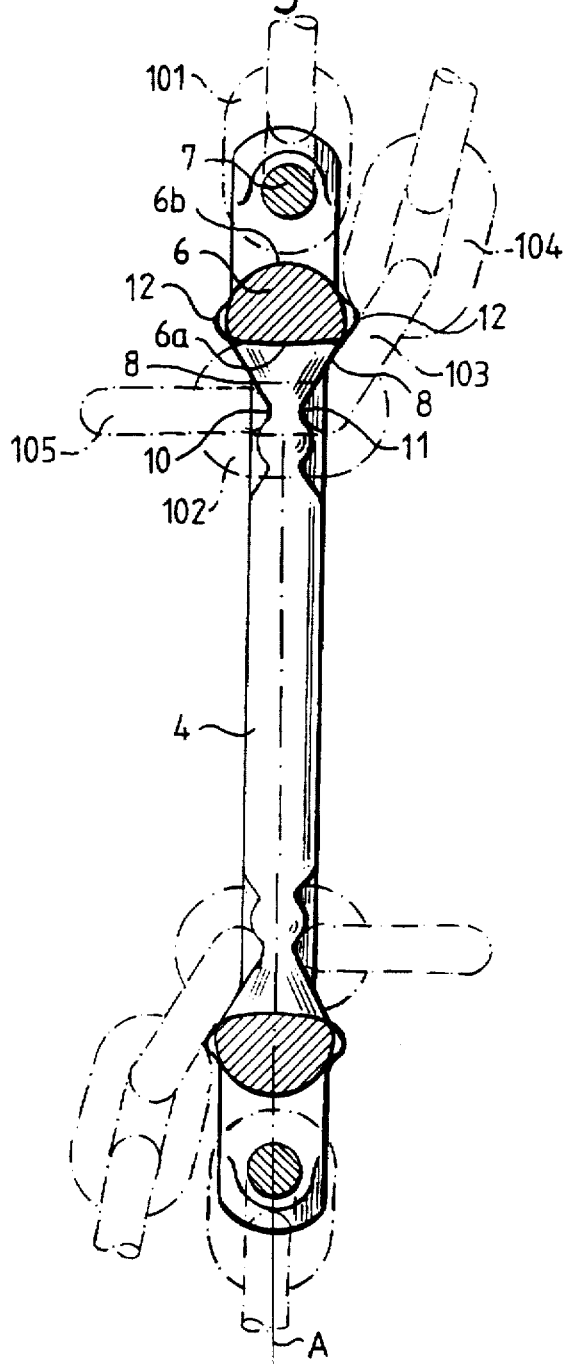

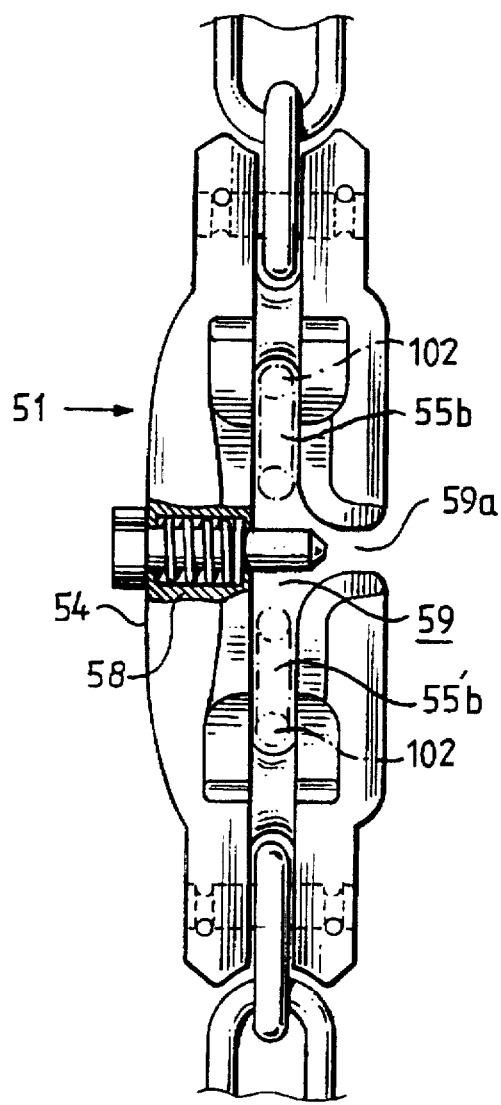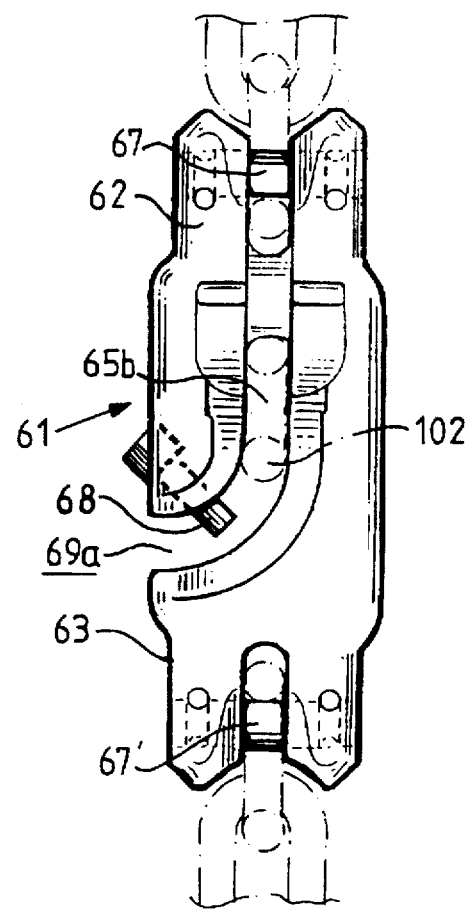

COUPLING LINK

FIELD OF THE INVENTION

The present invention relates to a coupling link for coupling two chain end portions to each other, comprising a link body, which is made in one piece and the end portions of which are provided with anchoring means for anchoring each chain end portion.

Such coupling links are primarily used in situations where it is desirable to form an endless sling of a chain.

PRIOR ART

Nowadays, the normal way to form such an endless chain sling is to use a grab hook, the eye of which is permanently connected to one end of the chain, whereas the other end portion of the chain is anchored to the hook by inserting one of the chain links sideways into the hook throat.

Such an arrangement, using a grab hook, has several drawbacks. In the first place, one has to use a shackle in order to couple the hook eye to an end link of the chain. Furthermore, the link supported in the hook throat may fall loose and become totally detached from the hook in case the loading force is interrupted for one reason or another. Moreover, a grab hook is normally relatively wide, and it may be difficult to thread it through in narrow places, e.g. between the goods to be lifted and an underlying floor or some other supporting surface.

SUMMARY OF THE INVENTION

Against this background, the main object of the present invention is to accomplish a coupling link, which is slender and shaped so as to permit the coupling link to be pulled or threaded through a narrow space while being coupled to two opposite chain end portions. Moreover, it is important that the chain end portions are securely anchored to the coupling link and that it is relatively easy to adjust the effective length of the respective chain end portion.

According to the invention, this object is achieved in that the link body is elongated with a length corresponding to at least twice, preferably at least 2.5 times, the greatest width thereof;

the link body is widest at its central portion and tapers towards each opposite end portion;

the opposite end portions of the link body are formed as fork-like portions with two longitudinally extending, substantially parallel shank portions defining a slot therebetween;

the width of the slot is dimensioned to accommodate a flat-wise oriented chain link;

each fork-like portion is provided with a bridge portion connecting the two shank portions to each other and, adjacent to the free end of the fork-like portion, a transversal anchoring pin for securely anchoring an end link of the associated chain end portion;

the free end of each fork-like end portion is dimensioned to smoothly adjoin said associated chain end portion upon anchoring said end link to said anchoring pin; and the central portion of the link body, between said two fork-like end portions, is provided with at least one central opening communicating with said slot and permitting insertion of a desired chain link so as to enable the formation of a non-loaded shortening loop of at least one of the two chain end portions.

Thus, the configuration of the coupling link is an elongated structure, the end portions of the link being preferably similar to each other and the central portion of the link body being wider than the two opposite end portions. Furthermore, the central portion tapers smoothly so as to merge with each such end portion, which in turn smoothly adjoins the associated chain end portion connected thereto.

These and other advantageous features of the coupling link are stated in the dependent claims and will become apparent from the detailed description below.

The invention will be described further below with reference to the appended drawings illustrating various preferred embodiments.

BRIEF DESCRIPTION OF THE DRAWINGS

FIG. 1 is a side view of a first embodiment of the coupling link according to the invention;

FIG. 2 is a longitudinal section along the plane B in FIG. 1;

FIG. 7 is a side view of a fifth embodiment of the coupling link; and

FIG. 8 is a side view of a sixth embodiment of the coupling link according to the invention.

DETAILED DESCRIPTION OF PREFERRED EMBODIMENTS

Figure 3:
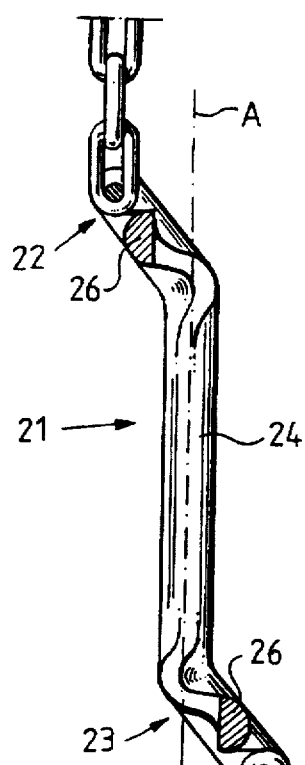
FIG. 3 is a sectional view of a second embodiment of the coupling link.

The coupling link shown in FIGS. 1 and 2 comprises an elongated link body 1 with two opposite end portions 2, 3 and a central portion 4. The length of the link body 1 is three times the greatest width of the central portion 4. The link body tapers smoothly towards each opposite end portion 2, 3.

The fork-like end portions 2, 3 are alike, and it is therefore sufficient to describe the upper end portion 2 in FIG. 1.

The fork-like end portion 2 includes two longitudinally extending, substantially parallel shank portions 2a, 2b, which define a slot 5 therebetween. The width of the slot 5 corresponds substantially to the material thickness of the link of the chain, the end portion of which is to be coupled to the coupling link.

A bridge portion 6 connects the two shank portions 2a, 2b to each other and divides the slot 5 into an upper part 5a and a lower part 5b. In the upper part 5a, there is a transversal anchoring pin 7 extending between the two shank portions 2a, 2b for securely anchoring an end link 101 (FIG. 2) to the free end of the coupling link. Moreover, the free end portion 2 (the ends of the shank portions 2a, 2b) smoothly adjoins the chain link being coupled to the anchored, flat-wise oriented end link 101.

The bridge portion 6 has a lower surface 6a facing the central portion 4 of the link body and being substantially rectilinear in a direction perpendicular to the main plane A of the coupling link 1 and concavely curved in this plane A. As appears from FIG. 2, the bridge portion 6 is slightly wider than the shank portions 2a, 2b (as seen in the central plane B of the slot 5) and is curved approximately as a half circle at its upper surface 6b. A supporting link 102 is oriented flat-wise in the lower part 5b of the slot 5 with its longitudinal axis oriented perpendicularly to the plane A while supporting the rectilinear lower surface 6a of the bridge portion 6. An adjoining link 103 is obliquely oriented while making contact with inclined lateral support surface portions 8, 9 at the sides of the shank portion 2a, 2b. The lower ends of these support surface portions 8, 9 merge with curved, recessed seating surfaces 10, 11, which engage with the end portion of an engagement link 105 adjoining the supporting link 102 at the non-loaded side of the chain (to the left in FIG. 2) and accommodate the lower end portion of the obliquely oriented link 103 (to the right in FIG. 2). The inclined lateral support surface portions 8, 9 extend upwardly somewhat above the lower surface 6a of the bridge portion 6 where they form laterally extending lugs 12.

With this arrangement, a non-loaded loop may be formed (to the left in FIG. 2), whereby the effective length of the chain end portion including the link 104 (to the right in FIG. 2) can be adjusted. Such adjustment of the effective length of the chain end portion can be made by inserting a desired supporting link 102 into the lower slot portion 5b.

This is made possible by the relatively wide central opening in the central portion 4 of the coupling link 1. The central opening 13 is wide enough to accommodate the adjoining links of the chain so as to permit the chain to be threaded through the central opening 13.

As appears from FIG. 1, the coupling link 1 is symmetrical in relation to a (horizontal) mid-plane which is perpendicular to the plane B. Consequently, another chain end portion, with a non-loaded shortening loop, can be secured to the other (lower) end portion 3 of the link body 1.

The central portion 4 of the link body tapers smoothly towards each end portion 2, 3 and merges externally with these end portions. Consequently, the overall geometrical shape of the chain link is somewhat like a spool and makes the link 1 suitable for use in situations where it has to be threaded through narrow passages etc.

Generally, the coupling link 1 can be used to connect two chain end portions with each other while permitting a desired shortening of each chain end portion.

In the second embodiment of the coupling link 21, shown in FIG. 3, the central portion 24 is like the one in FIG. 1 and extends in a main plane A. The upper, fork-like end portion 22 is obliquely oriented so as to project outwardly from the main plane A, on one side thereof (to the left), whereas the lower end portion 23 projects outwardly from the main plane A in the opposite direction, i.e. to the right in FIG. 3. The bridge portions 26 and the adjoining supporting and seating surfaces in the two parallel shank portions are modified in relation to the embodiment shown in FIG. 1. However, even in this case, a non-loaded loop can be formed at each end portion 22, 23.

Figure 4:
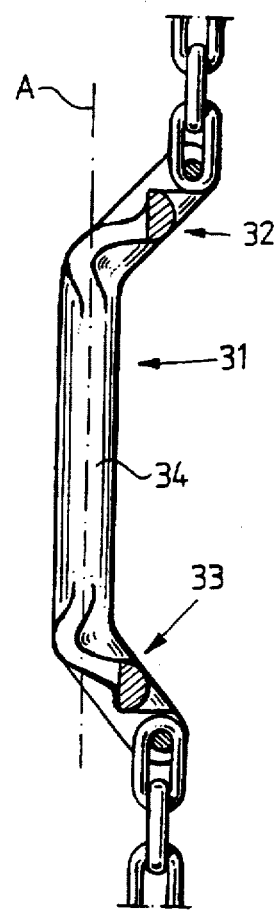
FIG. 4 is a sectional view through a third embodiment of the coupling link.

In the third embodiment of the coupling link 31, shown in FIG. 4, the two fork-like end portions 32 and 33 project outwardly in the same direction from the main plane A, in which the central portion 34 of the link body is located.

Figure 5:
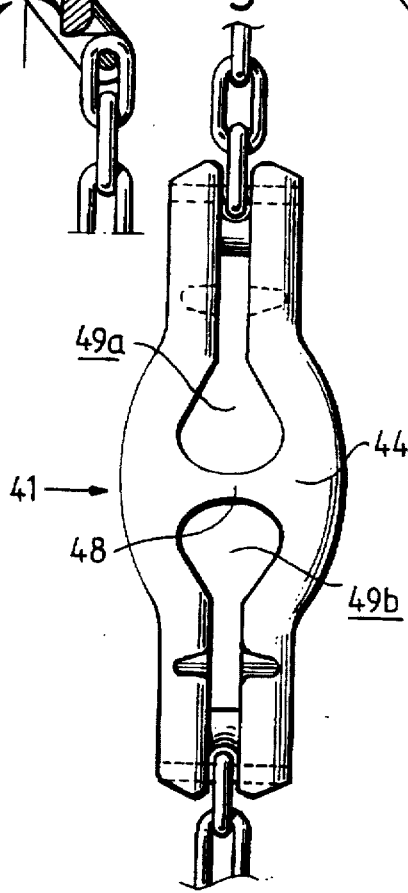
FIG. 5 is a side view of a fourth embodiment of the coupling link.
Figure 6:
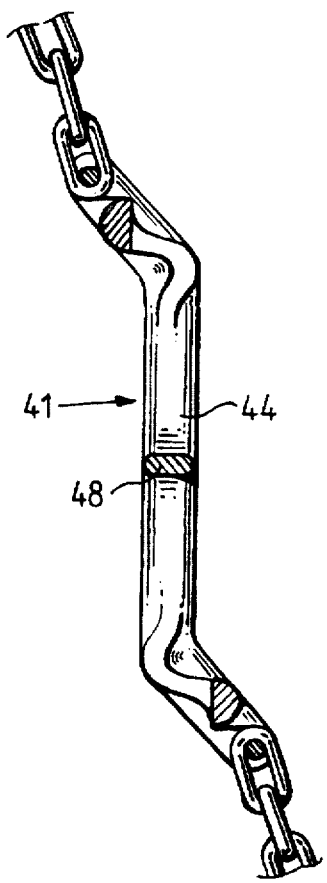
FIG. 6 is a sectional view through the link according to FIG. 5.

In FIGS. 5 and 6, a fourth embodiment is shown, which corresponds to the embodiment shown in FIG. 3 except for the fact that the central portion 24 of the link body 41 has a central web portion 48 dividing the interior of the link body 41 into two separate central openings 49a, 49b for threading through each one of two chain end portions.

In the fifth embodiment of the coupling link 51, shown in FIG. 7, the central portion of the link body 51 comprises a side opening 59a for side-wise insertion of the desired supporting link 102 into the central opening 59 which communicates with the respective slot portions 55b and 55'b. This embodiment has the advantage that the chain end portion does not have to be threaded through the central opening 59.

Upon positioning the respective supporting links 102 of the chain end portions, the side opening 59a can be effectively closed by a centrally located locking pin 58 which is spring-biassed to the illustrated locking position.

In FIG. 8, there is shown a sixth embodiment of the coupling link 61, where the side insertion opening 69a communicates with only one slot 65b associated with the upper fork-like end portion 62. In the lower fork-like end portion 63, there is only an anchoring pin 67'. Thus, a non-loaded shortening loop of the chain end portion can only be provided at the upper end of the coupling link 61. A spring-biassed locking pin 68 is adapted to normally obstruct the side opening 69a so as to lock in any supporting link 102 positioned in the slot portion 65b.

In all six embodiments described above, the overall length of the coupling link is at least twice, preferably at least 2.5 times, the greatest width thereof so as to make the elongated link slender and easy to thread through in narrow passages.

I claim:

1. A coupling link for coupling two chain ends comprising:

a one-piece link body having a central portion extending longitudinally in opposite directions to two end portions, each end portion terminating in a free end, said link body having a length from one free end to the other;

each end portion having a fork-like portion including a pair of longitudinally-extending, substantially-parallel shank portions, said pair of shank portions defining a slot therebetween;

each end portion including a bridge traversing said slot, connecting said pair of shank portions and dividing said slot into an upper slot, adjacent the free end, and a lower slot;

a transversal anchoring pin adjacent each bridge and extending between each pair of shank portions across a width of each upper slot, each slot being dimensioned to receive and orient a chain link in a flat-wise orientation to be traversed and anchored by said transversal anchoring pin, each slot being dimensioned to prevent insertion of a chain link oriented transverse to said flat-wise orientation;

said central portion defining at least one central opening, said central opening spatially communicating with at least one of said lower slots, said central opening being dimensioned to permit passage of a chain link oriented transverse to the flat-wise orientation and to permit positioning of a flat-wise oriented chain link in said lower slot, whereby a chain end portion can be formed in a sling between an end link anchored by said transversal anchoring pin and a support link positioned in said lower slot with a non-loaded shortening portion of the chain extending freely from the support link;

said link body having a greatest width at said central portion, said greatest width being transverse to said length and extending across said central opening; said link body having further widths transverse to said length, said widths tapering from said greatest width at said central portion to each of said free ends, said length being at least twice as great as said greatest width.

2. A coupling link as defined in claim 1, wherein said at least one central opening spatially communicates with the lower slot of both end portions.

3. A coupling link as defined in claim 1, wherein said at least one central opening communicates with only one of the lower slots.

4. A coupling link as defined in claim 1, wherein the central portion of the link body further includes a central web portion dividing said at least one central opening into upper and lower central openings.

5. A coupling link as defined in claim 1, wherein the central portion defines a side opening connecting to the at least one central opening, said side opening being dimensioned for passage of a flat-wise oriented link therethrough and into said at least one central opening.

6. A coupling link as defined in claim 1, wherein a locking member is mounted to the link body and adapted to releasably retain a supporting link in the lower slot.

7. A coupling link as defined in claim 1, wherein each of the shank portions is provided with a recessed seating surface for engagement with an engagement link adjoining a flat-wise oriented support link when located in a supporting position in said lower slot in contact with said bridge portion.

8. A coupling link as defined in claim 1, wherein the link body is substantially flat in a plane defined by said length and said greatest width.

9. A coupling link as defined in claim 1, wherein said central portion is substantially flat and lying on a main plane and each end portion is obliquely oriented so as to project outwardly from said main plane.

10. A coupling link as defined in claim 9, wherein the two end portions project from the central portion at an angle to each other.

11. A coupling link as defined in claim 9, wherein the two end portions project from the central portion parallel to each other.

* * * * *